Dec. 7, 1948.  G. M. HARRY  2,455,483
VARIABLE SPEED TRANSMISSION
Filed Sept. 25, 1946  4 Sheets—Sheet 3
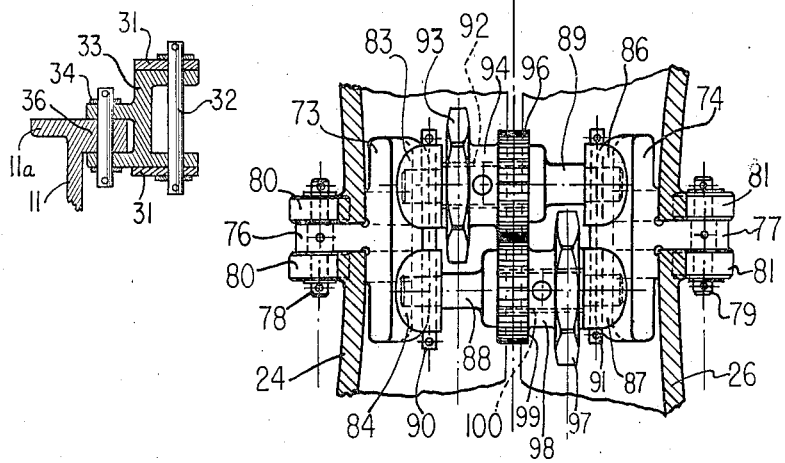
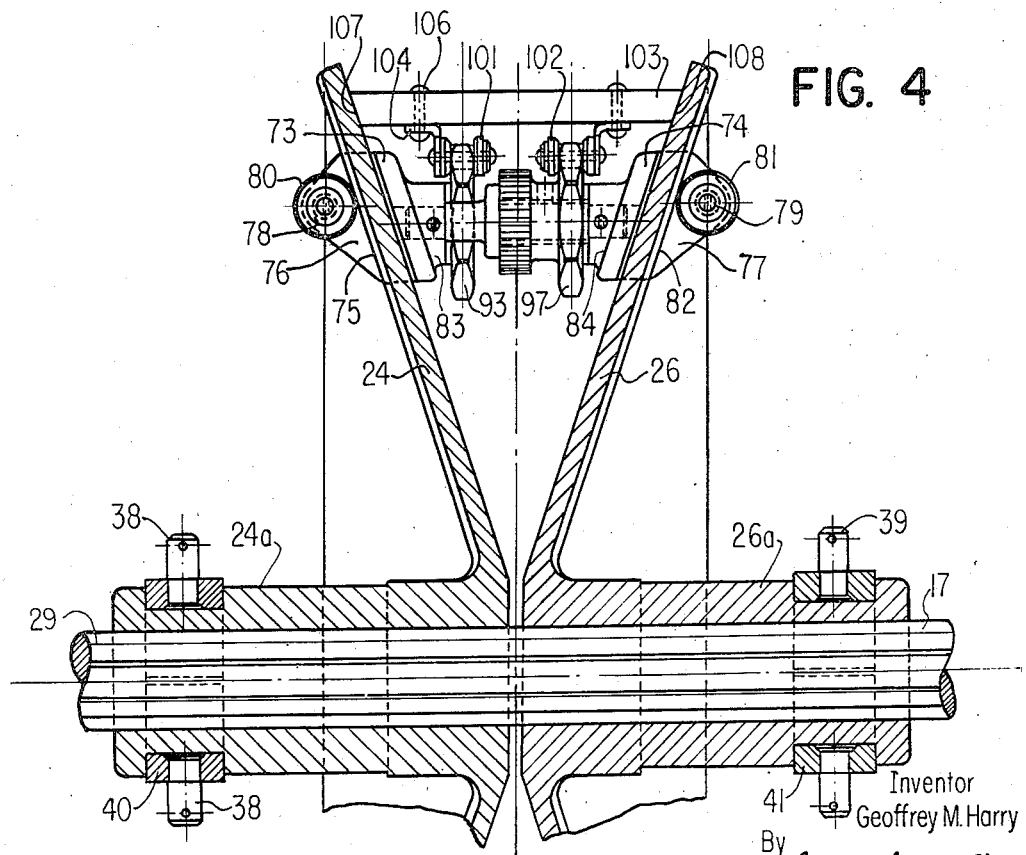
Inventor
Geoffrey M. Harry
By
Davis, Lindsey, Smith & Shonts
Attorneys Dec. 7, 1948.                G. M. HARRY                2,455,483
                       VARIABLE SPEED TRANSMISSION
Filed Sept. 25, 1946                              4 Sheets-Sheet 4
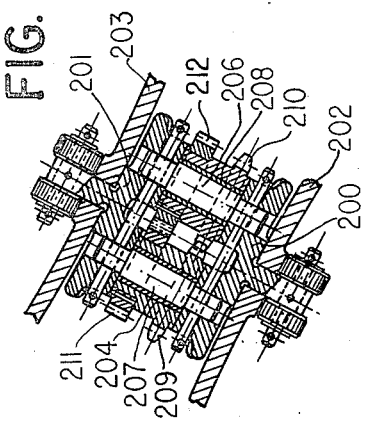
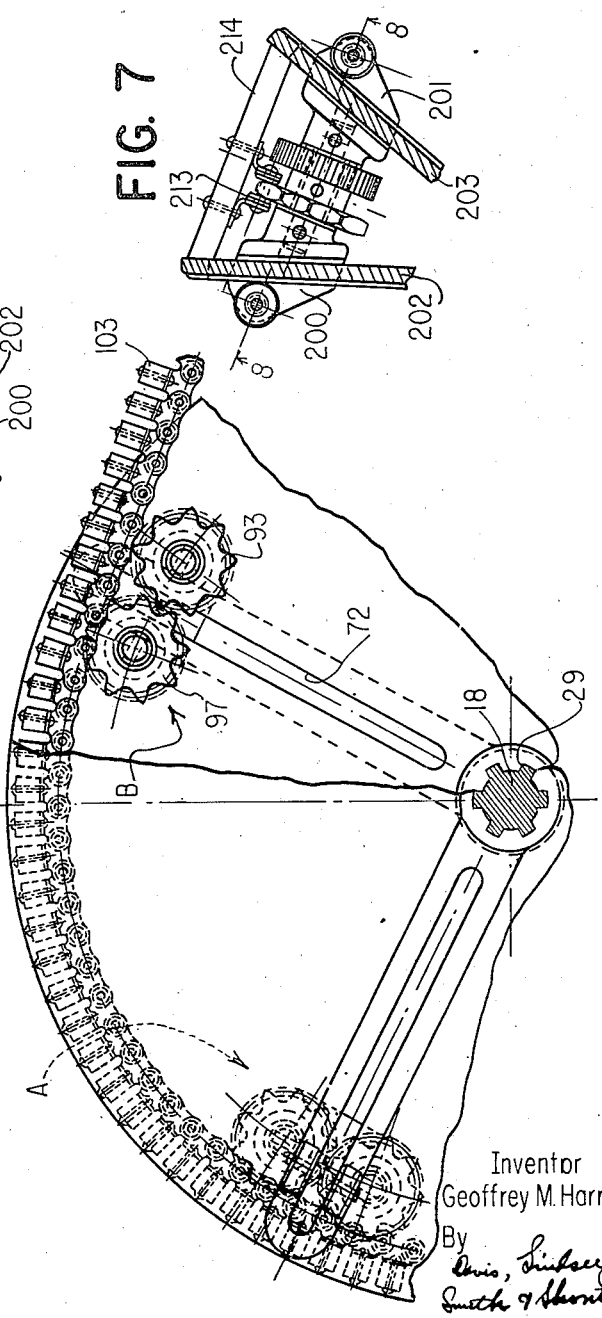
Inventor
Geoffrey M. Harry
By
Attorneys Patented Dec. 7, 1948

2,455,483

UNITED STATES PATENT OFFICE 2,455,483

VARIABLE-SPEED TRANSMISSION

Geoffrey M. Harry, Oak Park, Ill.

Application September 25, 1946, Serial No. 699,215

17 Claims. (Cl. 74—217)

This invention relates to a variable speed transmission and more particularly to a positive drive speed transmission that is infinitely variable within a predetermined range and by which the speed of a driving unit may be increased or decreased for transmission to a driven unit.

The infinitely variable speed transmission of the present invention comprises generally pairs of adjustable conical discs mounted for adjustment on the driving and driven shafts and sprockets associated with the conical discs and adapted to engage an endless chain for the transmission of driving torque from the driving shaft to driven shaft. Heretofore, variable speed transmissions including such conical discs, sprockets and chains have been devised and utilized to a limited extent but in the main they have been commercially unacceptable due to deficiencies in construction and operation. One major deficiency of such prior transmissions was the inability of the sprockets to properly mesh with the chains at the exact instant of time when driving engagement under load was required with the result that the output of the transmission was intermittent and jerky due to lost motion and slippage and a noticeable vibration occurred. Hence they were not positive in their operation.

Another disadvantage of such prior transmissions of the above type resulted from the fact that it was necessary in order to accomplish a change of speed, to stop the device and then reconnect it to the machine to be driven, this stoppage obviously resulting in loss of time and in imperfect adjustment in speed. Also, due to their inherent construction such transmissions were capable of being operated in but one direction and were therefore quite limited in their application and use.

It is, therefore, one of the objects of the present invention to provide an improved infinitely variable, positive drive, speed transmission.

Another object of the present invention is to provide a variable speed transmission by which driving torque may be constantly transmitted to a driven unit without lost motion, slippage or undue vibration.

Still another object of the present invention is to provide a variable speed transmission of the type comprising adjustable conical discs and a chain and sprocket drive in which the sprockets are arranged in pairs and are caused to properly mesh with the chain at the exact required instant of time without slippage, lost motion or undue vibration.

A further object of the present invention is to provide a variable speed transmission of the conical disc, chain and sprocket type which may be adjusted during operation thereof without operable disengagement thereof.

Another further object is to provide a variable speed transmission of the chain and sprocket type which may be operated in either direction and wherein either of the shafts may be the driving or the driven shaft.

A still further object is to provide a variable speed transmission comprising a positive drive through adjustable conical discs, sprockets carried by the discs and an endless chain engageable with the sprockets, the sprockets being arranged in pairs and freely self-adjusting for proper meshing engagement with the chain and being adapted to be locked together as a unit for driving or driven engagement with the chain.

Other and further objects and advantages of the present invention will become apparent hereinafter as this description progresses, reference being had to the accompanying drawings, in which:

Fig. 3 is a vertical sectional view of the pivotal supporting means for the conical disc controlling levers taken on the line 3—3 in Fig. 2, looking in the direction of the arrows;

Figure 4 is a fragmentary, vertical sectional view showing the relationship and details of construction of the conical discs, chains, driving sprockets and the sprocket-carrying members.

Fig. 5 is a top plan view of the fragmentary structure shown in Fig. 4 but with the chains and chain bars removed therefrom and the top portions of the conical dics cut away;

Fig. 6 is a fragmentary sectional view illustrating the relative positions of the pairs of driving sprockets as they appear when moving into engagement with the chains and after they are in complete driving engagement therewith;

Fig. 7 is a fragmentary, vertical sectional view showing a modified form embodying a single chain drive; and Fig. 8 is a horizontal sectional view taken on the line 8—8 in Fig. 7, looking in the direction of the arrows.

Figure 1:
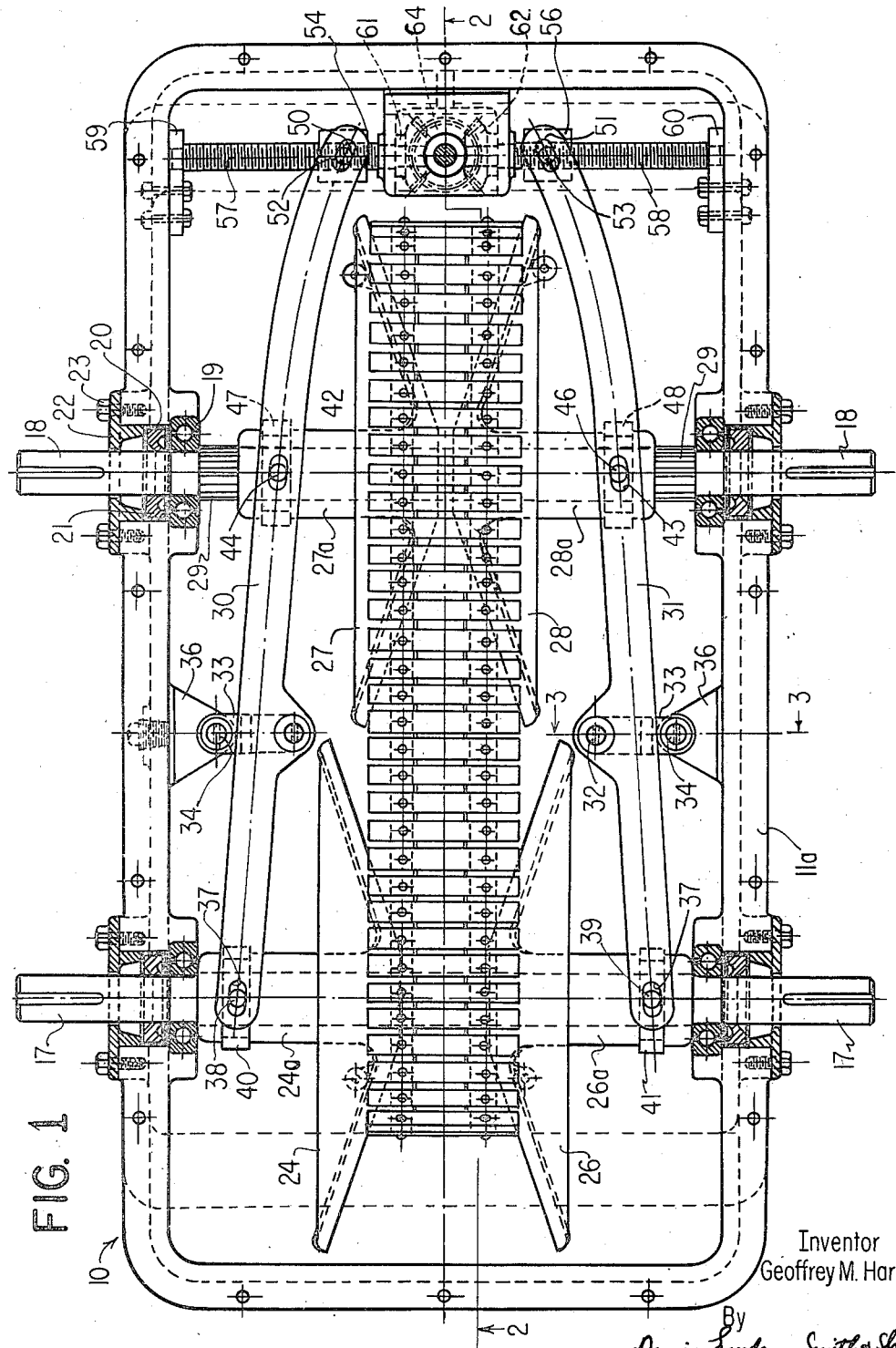
Figure 1 is a top plan view of a preferred embodiment of an infinitely variable, positive drive, speed transmission or speed changer comprising the present invention with the upper half of the casing removed therefrom.
Figure 2:
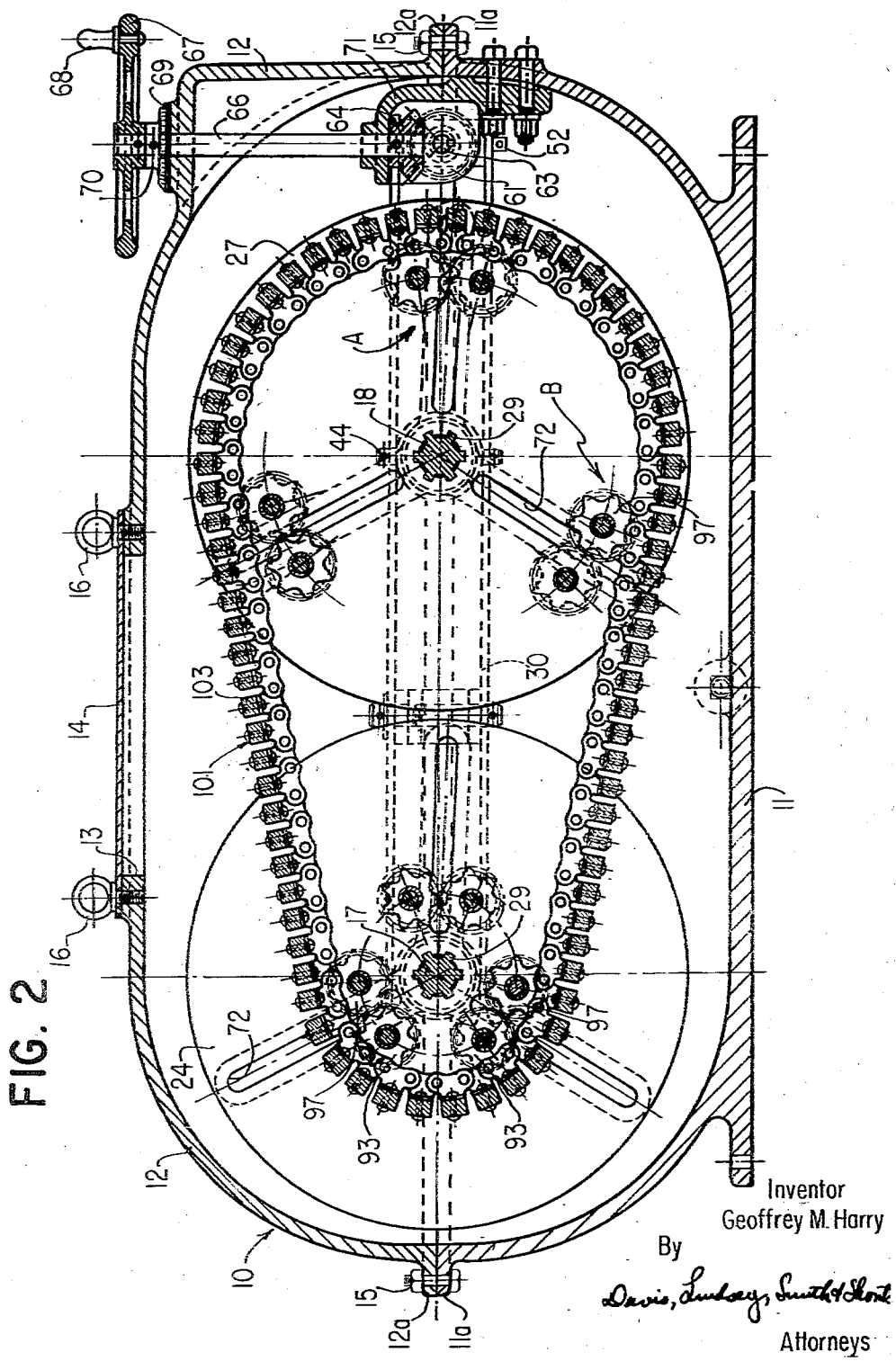
Fig. 2 is a vertical sectional view of the speed changer taken on the irregular line 2—2 in Fig. 1, looking in the direction of the arrows.

Referring now more specifically to Figs. 1 and 2 of the drawings, there is illustrated a preferred embodiment of an infinitely variable, positive drive, speed transmission or speed changer comprising the present invention which is mounted for operation in an oil bath within a casing 10. The casing 10 comprises a lower base portion 11, an upper portion 12 having a central opening 13 at its top for access to the interior of the casing 10, which opening is closed by a readily removable cover 14. The cover 14 is secured to the upper portion of the casing 12 by ring bolts 16 with which hooks may be engaged for transporting the unit. The upper and lower portions of the casing 10 are secured together by a plurality of bolts 15 extending through horizontal and outwardly directed flanges 11a and 12a of the casing portions 11 and 12, respectively, thereby forming a sealed oil tight compartment for the mechanism.

Extending transversely through the casing 10 and projecting outwardly on each side thereof in spaced relation are rotatable shafts 17 and 18, the axes of which are parallel and in the same horizontal plane. As will become apparent hereinafter, the structure and operation of the present speed transmission or speed changer is such that either shaft 17 or shaft 18 may be the driven or the driving shaft depending upon which is connected to the prime mover (not shown) and which is connected to the machine to be driven (not shown), the operation being exactly the same in either instance. However, for convenience and clarity of description, shaft 17 will be designated as the driving shaft and shaft 18 designated as the driven shaft. On each side of the casing 10 each of the shafts 17 and 18 are rotatably mounted on ball bearings 19 secured within the inner portions of casing openings 20, and outwardly of the bearings 19 are oil seals 21 encircling the shafts 17 and 18 and retained in place in the casing openings 20 by closure plates 22 bolted to the casing by bolts 23 and through which the outer ends of the respective shafts 17 and 18 extend.

On each of the shafts 17 and 18 within the casing 10 there are mounted for rotative movement therewith pairs of conically faced discs 24 and 26, and 27 and 28, respectively, the members of the pairs being slidable inwardly toward each other or outwardly away from each other on splines 29 secured to the shafts 17 and 18. As will be more fully described hereinafter, the inward and outward positions of the pairs of conical discs 24 and 26 and 27 and 28 determines the speed at which the driving torque is transmitted from the driving shaft 17 to the driven shaft 18. The inward and outward movement of the speed governing discs 24 and 26 and 27 and 28 is controlled by pairs of elongated levers 30 and 31 pivoted intermediate their ends, as shown in Figs. 1 and 3, on pins 32, 32 which extend vertically through bifurcated support members 33, 33 pivoted by means of pins 34, 34 to inwardly projecting lugs 36, 36 on the inner side walls of the lower casing portion 11.

The left ends of the pairs of levers 30 and 31, as viewed in Figs. 1 and 2, are provided with aligned slots 37, 37, into which are received upstanding and depending pins 38 and 39 carried on the top and bottom of split collars 40 and 41. The split collars 40 and 41 are mounted in annular channels in outwardly directed hubs 24a and 26a of the conical discs 24 and 26. Similarly, the pairs of levers 30 and 31 are provided with aligned slots 42 and 43 intermediate their pivotal mountings at 32 and their right end portions, and into these slots are received upstanding and depending pins 44 and 46 carried on the top and bottom of split collars 47 and 48, respectively, mounted in annular channels of outwardly directed hubs 27a and 28a of the conical discs 27 and 28. By the foregoing construction, rotative movement of the pairs of levers 30 and 31 about their pivotal supports on the casing lugs 36 will cause inward movement of one pair of discs toward each other and simultaneous outward movement of the other pair of discs away from each other. Thus, if the left ends of the pairs of levers 30 and 31 are pivoted inwardly, the collars 40 and 41 are also moved inwardly so as to cause the discs 24 and 26 on the driving shaft 17 also to move inwardly. Simultaneously, the collars 47 and 48 on the driven shaft 18 are moved outwardly forcing the discs 27 and 28 to also move outwardly and thus spread to more widely separated positions.

In order to effect the pivotal movement as above described, the pairs of levers 30 and 31 are provided with slots 50 and 51 adjacent their right ends into which are received upstanding and depending pins 52 and 53 secured to the top and bottom of threaded nuts 54 and 56. The nuts 54 and 56 are mounted in threaded engagement on aligned screws 57 and 58, respectively, extending in a direction transversely of the casing 10 at the right thereof and being supported at their outer ends in bearings 59 and 60 secured to the inner wall of the casing 10. On the inner adjacent ends of the screws 57 and 58 there are mounted bevel gears 61 and 62, respectively, for rotative movement therewith by means of keys 63. Each of the bevel gears 61 and 62 are in constant mesh with a bevel gear 64 secured to the lower end of a vertical shaft 66, and on the upper end of this shaft, which projects through and above the casing 10, is keyed a hand wheel 67 having a handle 68 secured thereto. A spacer disc 69 also is secured to the upper end of the shaft 66 between the hand wheel 67 and the upper casing member 12 by means of a pin 70 and the disc 69 may be calibrated on its lower edge in relation to a marker (not shown) on the casing member 12 to indicate the different speeds obtainable by rotation of the hand wheel 67. The spacer disc 69 and the hand wheel 67 also serve to support the shaft 66 at its upper end, while an upstanding bracket 71 bolted to the inner end wall of the lower casing portion 11 and projecting inwardly therefrom supports the shaft for rotative movement at its lower end. Thus, when the hand wheel 67 is rotated, pivotal movement of the pairs of levers 30 and 31 is effected through the shaft 66, the bevel gear 64, the bevel gears 61 and 62, the screws 57 and 58 and the nuts 54 and 56, the nuts 54 and 56 moving either closer together or farther apart on the screws 57 and 58 so as to move the right ends of the pairs of levers 30 and 31 either closer together or farther apart, depending upon the direction of rotation of the hand wheel 67.

The construction and operation of the conical discs 24 and 26 on the driving shaft 17 and their associated radially movable sprocket and gear units are, in the preferred embodiment of the present invention, identical in construction to the conical discs 27 and 28 and their associated sprocket and gear units on the driven shaft 18, and, therefore, it will suffice to describe in detail but one of the conical disc assemblies.

As shown more particularly in Figs. 2, 4, and 5 of the drawings, each of the conical discs 24 and 26 are provided with three radially directed slots 72 spaced approximately 120° apart and in which sprocket-supporting segments 73 and 74 are adapted to move in a radial direction as the discs 24 and 26 are moved relative to each other in a direction depending upon whether the speed of rotation of the driven shaft 18 is to be increased or reduced. The segments 73 and 74 are supported by and between the inclined faces of the conical discs 24 and 26 and have integral extensions 76 and 77 extending through and beyond the disc slots 72. Fixed pins 78 and 79 extend transversely through the extensions 76 and 77 and rotatably support pairs of rollers 80 and 81 which engage and rotate against smooth finished pads or tracks 75 and 82 on the rear inclined faces of the conical discs 24 and 26, respectively. The faces of the segments 73 and 74 in engagement with the inclined inner faces of the discs 24 and 26 are machined at the same angle as the disc faces to facilitate sliding movement therebetween.

The segments 73 and 74 are also provided on their inner sides with bosses 83 and 84 and 86 and 87, respectively, projecting in alignment toward each other and being provided with vertical faces disposed at right angles to the center line of the shaft 17. Small fixed shafts 88 and 89 extend in parallel and spaced relation between and into aligned bores in the segment bosses 83 and 86 and 84 and 87, respectively, and they are held in place by retaining pins 90 and 91 extending through the respective ends of the shafts 88 and 89 and the bosses 83 and 86, and 84 and 87, respectively. When the segments 73 and 74 are thus connected together by the fixed shafts 88 and 89, a rigid sprocket-supporting unit is formed which may move radially up and down the faces of the discs 24 and 26 upon movement thereof.

Mounted on a bushing 92 for free rotation on the fixed cross shaft 89 is a sprocket 93 having a hub 94 to which is secured a gear 96. Similarly, a sprocket 97 having a hub 98 to which is secured a gear 99, is mounted on a bushing 100 for free rotation on the fixed cross shaft 89. The gears 96 and 99 are in alignment and in constant mesh while the sprockets 93 and 97 are out of alignment and on opposite sides of the gears, one sprocket being adapted to be in advance or lead the other upon rotation of the conical discs 24 and 26.

The spaced sprockets 93 and 97 are adapted to engage endless roller chains 101 and 102 secured in parallel and properly spaced relationship to a plurality of supporting cross bars 103 by connecting lugs 104 and rivets 106. The chain support bars 103 may be of square cross section and their end faces 107 and 108 are beveled to conform to and evenly bear against the inclined inner faces of the conical discs 24 and 26. By the foregoing construction, as the conical discs 24 and 26 are moved, upon rotation of the handwheel 67, relatively along the shaft 17 with respect to each other, their inner inclined faces bear against the beveled faces 107 and 108 of the chain bars 103 and against the inclined faces of the segments 73 and 74 and cause the bars 103 and the chains 101 and 102 and the segments 73 and 74 to be forced simultaneously upwardly if the discs 24 and 26 are moved inwardly. If the conical discs are moved outwardly away from each other, then the sprocket-supporting segments are forced downwardly and inwardly toward the shaft 17, the chain bars and chains also following simultaneously by moving downwardly and inwardly and thereby maintaining engagement with the sprockets at all times during adjustment.

When the speed transmission or changer comprising the present invention has been operably connected with a prime mover and to a machine to be driven, the rotative movement of the driving shaft 17 will be transmitted to the chains 101 and 102 through positive driving connections comprising the conical discs 24 and 26, the segments 73 and 74 and the sprockets 93 and 97 which engage the chains. There is no frictional drive through the engagement of the conical discs with beveled ends of the chain bars 103 but this engagement serves primarily to support the chains at the proper radial distance from the shaft 17 for operable engagement with the sprockets. As shown in Fig. 2, at least one of the three pairs of sprockets 93 and 97 is always in full driving engagement with the chains 101 and 102, the other pairs either being in or out of such full engagement. If, therefore, the driving shaft 17 is rotating in a counterclockwise direction as viewed in Fig. 2, the sprockets 93 and 97 of the pair indicated by the letter A will each be in full driving engagement with the chains 101 and 102. Each of these sprockets, although freely mounted on their respective shafts 88 and 89, are incapable of rotative movement on their shafts, since they are locked against rotation through the intermeshed engagement of their respective gears 96 and 99. The rotative forces of the discs 24 and 26 tends to cause relative rotation of the sprocket 97 and its gear 99 in one direction and the rotation of the gear 96 and its sprocket 93 in the other direction. But since both sprockets of the pair A are in engagement with the chains 101 and 102, respectively, they cannot rotate in opposite directions, or in any direction, and hence they drive the chains as positive fixed units without any slippage whatsoever.

The novel interrelationship of the gears and sprockets also enables the sprockets to become properly meshed in driving engagement with the chains without any lost motion or slippage whatsoever. Referring more particularly to Figs. 2 and 6 of the drawings, the pair of sprockets A are in full driving engagement with the chains 101 and 102 and consequently the chains 101 and 102 are also being pulled or driven in a counterclockwise direction. In Fig. 6 the leading sprocket 97 of the pair indicated by the letter B has just moved into engagement with the chain 102. Should the leading tooth of the sprocket 97 which is stationary fail to engage precisely between the roller portions of the chain, the sprocket will, due to the chain pressure and its free mounting on the fixed shaft 88, be turned slightly in one direction or the other until they are in perfect mesh.

This slight rotational positioning movement of the sprocket 97 with respect to the chain 102 is transmitted to the sprocket 93 through the gears 96 and 99, the sprocket 93 being rotated slightly in the opposite direction by only a distance sufficient to place the teeth of the sprocket 93 in proper chain engaging position. This rolling or positioning movement of the sprocket 97 occurs when the pair B of sprockets is not under load. As the chain 102 and the discs 24 and 26 continue their movement, the sprocket 97 is rotated in one direction and the sprocket 93 is rotated in the opposite direction through the gears 96 and 99. But when one of the teeth of the rear sprocket 93 rotates into engagement with its chain 101 upon further rotation of the discs 24 and 26, further rotation of the sprocket 93 is prevented and simultaneously further rotation of the sprocket 97 is also prevented, the sprockets 93 and 97 being locked against rotation through the gears 96 and 99 and thus forming a fixed driving unit. The driving load is on the sprockets only when they are locked against rotation and hence little or no wear is experienced by the sprocket teeth. Thus during operation of the speed changer, the pairs of sprockets continuously become engaged and disengaged with the chains 101 and 102 but at least one of the pairs is always in driving engagement therewith.

As the chains 101 and 102 are driven by the sprockets 96 and 97 of the discs 24 and 26, their movement is transmitted to the driven shaft 18 through the sprockets 96 and 97 and the segments 73 and 74 of the driven conical discs 27 and 28. The manner in which the pairs of sprockets of these driven discs 27 and 28 mesh with the chains 101 and 102 is exactly the same as those of the driving discs 24 and 26; so that there is no lost motion or slippage between the chains and the sprockets. Consequently, by the foregoing positive chain and sprocket arrangement the torque of the driving shaft 17 is transmitted fully and completely to the driven shaft 18 without any lost motion or slippage between the parts.

As shown in Figs. 1 and 2, the pairs of sprockets of the driving discs 24 and 26 are positioned at the lower inner radial ends of the slots 72 adjacent the shaft 17, the discs 24 and 26 being relatively far apart, while the pairs of sprockets of the driven discs 27 and 28 are adjacent the upper outer radial ends of the slots 72, the driven discs 24 and 26 being closer together. In this relative arrangement of the parts, the shaft 18 is being driven at a lower rate of speed than the driving shaft 17.

If it is desired to increase the rate of speed of driven shaft 18, the hand wheel 67 may be rotated in the proper direction so as to pivot the pairs of levers 30 and 31 and cause their left ends to move inwardly toward each other. The driving discs 24 and 26 are thereby caused to move inwardly toward each other forcing the sprocket-carrying segments 73 and 74 and the chain bars 103 to ride upwardly on the inclined disc faces and increasing the operable diameter of the chains thereover. Simultaneously, the driven discs 27 and 28 on the driven shaft 18 are moved outwardly, thus permitting their sprocket-carrying segments 73 and 74 and the chain bars 103 to be drawn inwardly and downwardly on the inclined disc faces and thereby decreasing the operable diameter of the chains thereover. Thus, a decrease in the diameter of the chains 101 and 102 over one pair of discs and sprockets is compensated by a simultaneous increase in their diameter over the other pair of discs and sprockets, the chains 101 and 102 remaining taut at all times and permitting adjustments in the rate of speed when the speed changer is operably connected and in full operation.

In Figs. 7 and 8 of the drawings there is shown a modified form of speed changer comprising a one chain drive. This modification is similar to that of the embodiment shown in Figs. 1 to 6, inclusive, of the drawings in that it comprises segments 200 and 201 mounted in slots in conical discs 202 and 203 and having a pair of fixed and spaced shafts 204 and 206 secured therein and extending therebetween. The shafts 204 and 206 are provided with bushings 207 and 208 on which are mounted for free rotational movement sprockets 207 and 210 having hubs on which are mounted gears 211 and 212 in alignment and in constant mesh. However, in contrast to the structure of the first embodiment the sprockets 209 and 210 are arranged in alignment and in the same plane on the same side of the gears 211 and 212 so as to mesh with the single chain 213 having supporting cross bars 214 secured thereto. However, the manner of operation of this modified form of single chain speed changer is substantially the same as that of the first embodiment and, hence, the description thereof will not be repeated.

It is apparent that the forms of speed changers described above are of relatively simple and inexpensive construction, comprising many parts of standard makes and structure and other parts that may be readily fabricated with a minimum of manufacturing operation. At the same time the speed changers are infinitely variable within a specified range and they are positive in their drive without any slippage, thereby providing smooth and continuous operation with a minimum of wear on the interengaging parts.

Although there have been illustrated in the drawings and described in detail above two embodiments of the speed transmission comprising the present invention, it is apparent that changes in details of construction and manner of assembly may be made without departing from the spirit and scope of the appended claims.

I claim:

1. A variable speed transmission comprising a rotary driving shaft, a rotary driven shaft, a pair of rotary members mounted in spaced relation on each of said shafts for rotation therewith and extending radially therefrom, a plurality of pairs of sprockets carried in spaced relation by and between said respective pairs of rotary members and adapted for free rotative movement and for movement radially of said rotary members toward and from said respective shafts, means for each pair of sprockets operably connected therewith for transmitting rotary movement of one sprocket in one direction to the other sprocket for rotary movement in the other direction, and an endless chain adapted to be interengaged with the respective pairs of sprockets of said rotary members.

2. A variable speed transmission comprising a rotary driving shaft, a rotary driven shaft, a pair of rotary members mounted in spaced relation on each of said shafts for rotation therewith and extending radially therefrom, a plurality of pairs of sprockets carried in spaced relation by and between said respective pairs of rotary members and adapted for free rotative movement and for movement radially of said rotary members toward and from said respective shafts, means for each pair of sprockets operably connected therewith for transmitting rotary movement of one sprocket in one direction to the other sprocket for rotary movement in the other direction, and an endless chain adapted to be interengaged with the respective pairs of sprockets of said rotary members, one of the sprockets of each pair being mounted in advance of the other sprocket and adapted to engage said chain before said other sprocket and said other sprocket being adapted to be rotated through rotary movement transmitting means upon initial engagement of said advance sprocket with the chain, and said pairs of sprockets being adapted to be locked against rotation by said transmitting means upon engagement of both of said sprockets with the chain.

3. A variable speed transmission comprising a rotary driving shaft, a rotary driven shaft, a pair of rotary members mounted in spaced relation on each of said shafts for rotation therewith and extending radially therefrom, a plurality of pairs of sprockets carried in spaced relation by and between said respective pairs of rotary members and adapted for free rotative movement and for movement radially of said rotary members toward and from said respective shafts, a pair of gears for each pair of sprockets mounted in constant mesh with each other and operably connected to said respective sprockets for rotation therewith, and an endless chain adapted to be interengaged with the respective pairs of sprockets of the said rotary members.

4. A variable speed transmission comprising a rotary driving shaft, a rotary driven shaft, a pair of rotary members mounted in spaced relation on each of said shafts for rotation therewith and extending radially therefrom, a plurality of pairs of sprockets carried in spaced relation by and between said respective pairs of rotary members and adapted for free rotative movement and for movement radially of said rotary members toward and from said respective shafts, a pair of gears for each pair of sprockets mounted in constant mesh with each other and operably connected to said respective sprockets for rotation therewith, and an endless chain adapted to be interengaged with the respective pairs of sprockets of the said rotary members, one of the sprockets of each pair being mounted in advance of the other sprocket and adapted to engage said chain before said other sprocket, said other sprocket being adapted to be rotated through said gears upon initial engagement of said advance sprocket with the chain, and said pairs of sprockets being adapted to be locked against rotation by said gears upon engagement of both of said sprockets with the chain.

5. A variable speed transmission comprising a rotary driving shaft, a rotary driven shaft, a pair of rotary members mounted in spaced relation on each of said shafts for rotation therewith and having radially extending slots in spaced relation, the slots of one of the rotary members being in substantial alignment with the slots of the other rotary member of the pair, a plurality of sprocket supporting means carried by and between said rotary members for radial movement in said aligned slots and comprising a pair of fixed parallel, spaced shafts, a sprocket mounted for free rotation on each shaft, a gear also mounted for free rotation on each shaft and operably connected to the sprocket on said shaft for rotation therewith, the gear on one shaft being in constant mesh with the gear on the other shaft, and an endless chain adapted to be interengaged with the respective sprockets of the said respective rotary members.

6. A variable speed transmission comprising a rotary driving shaft, a rotary driven shaft, a pair of cones mounted in spaced relation on each of said shafts for rotation therewith and for axial adjustment therealong and being provided with spaced radially extending slots, the slots of one of the cones of a pair being in substantial alignment with the slots of the other cone of said pair, a plurality of pairs of sprockets carried by and between said respective pairs of cones and adapted for free rotative movement and for radial movement in said cone slots toward and from said shafts, means for each pair of sprockets operably connected therewith for transmitting rotary movement of one sprocket in one direction to the other sprocket for rotary movement in the other direction, and an endless chain adapted to be interengaged with the respective pairs of sprockets of said cones.

7. A variable speed transmission comprising a rotary driving shaft, a rotary driven shaft, a pair of cones mounted in spaced relation on each of said shafts for rotation therewith and for axial adjustment therealong and being provided with spaced radially extending slots, the slots of one of the cones of a pair being in substantial alignment with the slots of the other cone of said pair, sprocket supporting means caried by and between said pairs of cones for radial movement in said aligned slots and comprising a pair of fixed and spaced parallel shafts, a sprocket mounted for free rotation on each shaft, a gear also mounted for free rotation on each shaft and operably connected to the sprocket on said shaft for rotation therewith, the gear on one shaft being in constant mesh with the gear on the other shaft, and an endless chain adapted to be interengaged with the respective sprockets of the said respective rotary members.

8. A variable speed transmission comprising a rotary driving shaft, a rotary driven shaft, a pair of cones mounted in spaced relation on each of said shafts for rotation therewith and for axial adjustment therealong and being provided with spaced radially extending spaced slots, the slots of one of the cones of a pair being in substantial alignment with the slots of the other cone of said pair, sprocket-supporting means carried by and between said pairs of cones for radial movement in said aligned slots and comprising a pair of fixed and spaced parallel shafts, a sprocket mounted for free rotation on each shaft, a gear also mounted for free rotation on each shaft and operably connected to the sprocket on said shaft for rotation therewith, the gear on one shaft being in constant mesh with the gear on the other shaft, an endless chain adapted to be interengaged with the respective sprockets of the said respective cones, and a plurality of cross bars secured to said chain and having end portions adapted to ride and be supported upon said pairs of cones for supporting said chain in sprocket engaging position.

9. A variable speed transmission comprising a rotary driving shaft, a rotary driven shaft, a pair of cones mounted in spaced relation on each of said shafts for rotation therewith and for axial adjustment therealong and being provided with spaced radially extending slots, the slots of one of the cones of a pair being in substantial alignment with the slots of the other cone of said pair, sprocket-supporting means supported on the faces of said cones and extending through said aligned slots and comprising a pair of fixed and spaced parallel shafts, a sprocket mounted for free rotation on each shaft, a gear also mounted for free rotation on each shaft and operably connected to the sprocket on said shaft for rotation therewith, the gear on one shaft being in constant mesh with the gear on the other shaft, an endless chain adapted to be interengaged with the respective sprockets of said respective rotary members, a plurality of cross bars secured to said chain and having end portions adapted to ride and be supported upon said faces of said cones for supporting said chain in sprocket engaging position, and means moving the cones axially on one shaft closer together so as to increase the operable diameter defined by the sprockets carried thereby and for moving the other cones on the other shaft axially away from each other so as to decrease the operable diameter defined by the sprockets carried by said other cone.

10. A variable speed transmission comprising a rotary driving shaft, a rotary driven shaft, a pair of rotary members mounted in spaced relation on each of said shafts for rotation therewith and extending radially therefrom, a plurality of sprocket-supporting means carried in spaced relation by and between said rotary members for radial movement therein toward and from said respective rotary shafts and comprising a pair of fixed, spaced parallel shafts, a sprocket mounted for free rotation on each fixed shaft, the sprocket on one shaft being spaced from and out of alignment with the sprocket on the other shaft of the pair, a gear also mounted for free rotation on each shaft and operably connected to the sprocket on said shaft for rotation therewith, the gears on the respective shafts of the pairs being in constant mesh and disposed on the shafts intermediate the sprockets, and a pair of endless chains extending in spaced relation for interengagement with the respective spaced sprockets of the rotary members.

11. A variable speed transmission comprising a rotary driving shaft, a rotary driven shaft, a pair of rotary members mounted in spaced relation on each of said shafts for rotation therewith and extending radially therefrom, a plurality of sprocket-supporting means carried in spaced relation by or between said rotary members for radial movement thereon toward and from said respective rotary shafts and comprising a pair of fixed, spaced parallel shafts, sprockets mounted in alignment with each other for free rotation on said respective fixed shafts, gears also mounted for free rotation on said respective fixed shafts and operably connected to the respective sprockets thereon for rotation therewith, said gears being in constant mesh with each other, and an endless chain adapted to be interengaged with the aligned respective sprockets of the rotary members.

12. A variable speed transmission comprising a rotary driving shaft, a rotary driven shaft, a rotary sprocket-carrying member mounted on each of said shafts for rotation therewith and extending radially therefrom, a plurality of pairs of sprockets mounted in spaced relation on said members and adapted for free rotative movement and for movement radially of said members toward and from said respective shafts, means for each pair of sprockets operably connected therewith for transmitting rotary movement of one sprocket in one direction to the other sprocket for rotary movement in the other direction, and an endless chain adapted to be interengaged with the respective pairs of sprockets of said rotary members.

13. A variable speed transmission comprising a rotary driving shaft, a rotary driven shaft, a rotary sprocket-carrying member mounted on each of said shafts for rotation therewith and extending radially thereof, a plurality of pairs of sprockets mounted in spaced relation on said members and adapted for free rotative movement and for movement radially of said members toward and from said respective shafts, a pair of gears for each pair of sprockets mounted in constant mesh with each other and operably connected to said respective sprockets for rotation therewith, and an endless chain adapted to be interengaged with the respective pairs of sprockets of the said rotary members.

14. A variable speed transmission comprising a rotary driving shaft, a rotary driven shaft, a rotary sprocket-carrying member mounted on each of said shafts for rotation therewith and extending radially thereof, sprocket means mounted on each of said sprocket-carrying members for rotation therewith and an endless chain adapted to be interengaged with the sprocket means of said rotary members, the sprocket means of at least one of said rotary sprocket-carrying members comprising a plurality of pairs of sprockets mounted in spaced relation on said one member and adapted for free rotative movement and for movement radially of said member toward and from its shaft and means operably connected with each pair of sprockets for transmitting rotary movement of one sprocket in one direction to the other sprocket for rotary movement thereof in the other direction.

15. A variable speed transmission comprising a rotary driving shaft, a rotary driven shaft, a rotary sprocket-carrying member mounted on each of said shafts for rotation therewith and extending radially thereof, sprocket means mounted on each of said sprocket-carrying members for rotation therewith and an endless chain adapted to be interengaged with the sprocket means of said rotary members, the sprocket means of at least one of said rotary sprocket-carrying members comprising a plurality of pairs of sprockets mounted in spaced relation on said one member and adapted for free rotative movement and for movement radially of said member toward and from its shaft and a pair of gears for each pair of sprockets mounted in constant mesh with each other and operably connected to said respective sprockets for rotation therewith.

16. A variable speed transmission comprising a rotary driving member, a rotary driven member, a plurality of pairs of sprockets mounted in spaced relation on said members and adapted for free rotative movement and for movement radially of said members toward and from their respective axes, means operably connected with each pair of sprockets for transmitting rotary movement of one sprocket in one direction to the other sprocket for rotary movement in the other direction, and an endless chain adapted to be interengaged with the respective pairs of sprockets of said rotary members.

17. A variable speed transmission comprising a rotary driving member, a rotary driven member, sprocket means mounted on each of said members for rotation therewith and an endless chain adapted to be interengaged with the sprocket means of said rotary members, the sprocket means of at least one of said rotary members comprising a plurality of pairs of sprockets mounted in spaced relation on said one member and adapted for free rotative movement and for movement radially of said one member toward and from its axis of rotation and means operably connected with each pair of sprockets for transmitting rotary movement of one sprocket in one direction to the other sprocket for rotary movement thereof in the other direction.

GEOFFREY M. HARRY.

REFERENCES CITED

The following references are of record in the file of this patent:

UNITED STATES PATENTS

| Number | Name | Date |
| --- | --- | --- |
| 724,450 | Dumaresq | Apr. 7, 1903 |
| 1,650,449 | Jaeger | Nov. 22, 1927 |
| 2,341,076 | Booth | Feb. 8, 1944 |